(12) United States Patent
Dey et al.

(10) Patent No.: US 11,556,747 B2
(45) Date of Patent: Jan. 17, 2023

(54) TESTING BIAS CHECKERS

(71) Applicant: International Business Machines Corporation, Armonk, NY (US)

(72) Inventors: Kuntal Dey, New Delhi (IN); Diptikalyan Saha, Bangalore (IN); Deepak Vijaykeerthy, Chennai (IN); Pranay Kumar Lohia, Bhagalpur (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 967 days.

(21) Appl. No.: 16/365,519

(22) Filed: Mar. 26, 2019

(65) Prior Publication Data

US 2020/0311486 A1    Oct. 1, 2020

(51) Int. Cl.
 G06F 9/44    (2018.01)
 G06K 9/62    (2022.01)
 G06N 5/04    (2006.01)
 G06F 9/54    (2006.01)
 G06F 11/263    (2006.01)
 G06N 20/00    (2019.01)

(52) U.S. Cl.
 CPC ........... *G06K 9/6265* (2013.01); *G06F 9/542* (2013.01); *G06F 11/263* (2013.01); *G06K 9/6231* (2013.01); *G06K 9/6257* (2013.01); *G06N 5/04* (2013.01); *G06N 20/00* (2019.01)

(58) Field of Classification Search
 CPC .. G06K 9/6265; G06K 9/6231; G06K 9/6257; G06F 9/542; G06F 11/263; G06N 5/04; G06N 20/00

USPC ......................................................... 717/124
See application file for complete search history.

(56) References Cited

U.S. PATENT DOCUMENTS 9,652,745 B2    5/2017   Taylor et al.
2019/0339688 A1*  11/2019  Cella .................. G05B 23/0229

OTHER PUBLICATIONS

AWS Albarghouthi et al., "Quantifying Program Bias", arXiv:1702.05437v2 [cs.PL], Mar. 7, 2017, 23 pages.
AWS Albarghouthi et al., "Fairness as a Program Property", arXiv:1610.06067v1 [cs.PL], Oct. 19, 2016, 6 pages.
(Continued)

*Primary Examiner* — Chuck O Kendall
(74) *Attorney, Agent, or Firm* — Ference & Associates LLC

(57) ABSTRACT

One embodiment provides a method, including: receiving a dataset and a model corresponding to a bias checker, wherein the bias checker detects bias within both the dataset and the model, based upon a bias checking algorithm and a bias checking policy, wherein the dataset comprises a plurality of attributes; testing the bias checking algorithm of the bias checker by (i) generating test cases that modify the dataset by introducing bias therein and (ii) running the bias checker against the modified dataset; testing the bias checking policy of the bias checker by generating a plurality of test cases and running the bias checker against the plurality of test cases; and providing a notification to a user regarding whether the bias checker failed to indicate bias for one or more of the plurality of attributes.

20 Claims, 3 Drawing Sheets

(56) References Cited

OTHER PUBLICATIONS

Center for Democracy & Technology, "Digital Decisions: Policy Tools in Automated Decision-Making", Jan. 14, 2016, 15 pages, Center for Democracy & Technology, www.cdt.org, Washington, D.C., USA.

Zhe Zhang et al., "Identifying Significant Predictive Bias in Classifiers", arXiv:1611.08292v2 [stat.ML], Jul. 4, 2017, 5 pages.

Antonio Torralba et al., "Unbiased Look at Dataset Bias", CVPR 2011, 2011, 9 pages, Carnegie Library of Pittsburgh Interlibrary Loan.

Indre Zliobaite, "Measuring discrimination in algorithmic decision making", Data Mining and Knowledge Discovery, Jul. 2017, 34 pages, vol. 31, Issue 4, Carnegie Library of Pittsburgh Interlibrary Loan.

* cited by examiner

TESTING BIAS CHECKERS

BACKGROUND

People frequently rely on entities to make decisions that impact an aspect of the person's life, for example, the person may apply to college, apply for a mortgage for a new home, apply for a car loan, apply for a credit card, and the like. In order to reduce the amount of human bias that may be introduced into the decision-making process, many entities employ decision models that will take relevant information as input and then provide a decision based upon this input. For example, if a person is applying for a mortgage, the mortgage company may employ a model that will provide an output indicating whether the mortgage applicant qualifies for a mortgage and what the terms for the mortgage should be, based upon information provided by the mortgage applicant. Employing the models allows the entity to provide a more consistent or standardized decision-making process across all of the people who are requesting a decision.

However, these models are programmed by one or more users, for example, using a dataset that identifies the algorithm or a training set of data used for making decisions. Additionally, the models can evolve over time based upon historical decisions. Accordingly, the models may either include an initial bias or may learn a bias over time. Thus, users and/or entities may employ bias checkers or bias detectors that are used to determine if bias exists within the dataset and/or model. The bias checker can be deployed against the model and/or dataset to determine whether the model and/or training dataset includes bias. Particularly, the bias checker can be used to determine whether the model and/or dataset include bias within attributes of the dataset that are indicated as protected, or attributes that are identified as not being allowed to bias a decision. If the bias checker determines that the model and/or dataset includes bias, the bias checker can notify the user and/or entity and the user can take remedial action in order to eliminate the bias included within the model and/or dataset.

BRIEF SUMMARY

In summary, one aspect of the invention provides a method, comprising: receiving a dataset and a model corresponding to a bias checker, wherein the bias checker detects bias within both the dataset and the model, based upon a bias checking algorithm and a bias checking policy, wherein the dataset comprises a plurality of attributes, wherein at least one of the plurality of attributes is identified as protected and wherein at least another of the plurality of attributes is identified as unprotected; testing the bias checking algorithm of the bias checker by (i) generating test cases that modify the dataset by introducing bias therein and (ii) running the bias checker against the modified dataset; testing the bias checking policy of the bias checker by generating a plurality of test cases and running the bias checker against the plurality of test cases, wherein the generating comprises: identifying a correlation between (i) an attribute identified as protected and (ii) an attributed identified as unprotected, wherein a correlation is identified between at least one unprotected attribute and at least one protected attributes having the highest correlation value of the dataset; and generating a test case having a generated dataset comprising (i) the protected attributes and (ii) the unprotected attributes having the highest correlation value to the protected attributes, wherein the generated dataset includes values including bias for each of the attributes of the generated dataset; and providing a notification to a user regarding whether the bias checker failed to indicate bias for one or more of the plurality of attributes.

Another aspect of the invention provides an apparatus, comprising: at least one processor; and a computer readable storage medium having computer readable program code embodied therewith and executable by the at least one processor, the computer readable program code comprising: computer readable program code configured to receive a dataset and a model corresponding to a bias checker, wherein the bias checker detects bias within both the dataset and the model, based upon a bias checking algorithm and a bias checking policy, wherein the dataset comprises a plurality of attributes, wherein at least one of the plurality of attributes is identified as protected and wherein at least another of the plurality of attributes is identified as unprotected; computer readable program code configured to test the bias checking algorithm of the bias checker by (i) generating test cases that modify the dataset by introducing bias therein and (ii) running the bias checker against the modified dataset; computer readable program code configured to test the bias checking policy of the bias checker by generating a plurality of test cases and running the bias checker against the plurality of test cases, wherein the generating comprises: identifying a correlation between (i) an attribute identified as protected and (ii) an attributed identified as unprotected, wherein a correlation is identified between at least one unprotected attribute and at least one protected attributes having the highest correlation value of the dataset; and generating a test case having a generated dataset comprising (i) the protected attributes and (ii) the unprotected attributes having the highest correlation value to the protected attributes, wherein the generated dataset includes values including bias for each of the attributes of the generated dataset; and computer readable program code configured to provide a notification to a user regarding whether the bias checker failed to indicate bias for one or more of the plurality of attributes.

An additional aspect of the invention provides a computer program product, comprising: a computer readable storage medium having computer readable program code embodied therewith, the computer readable program code executable by a processor and comprising: computer readable program code configured to receive a dataset and a model corresponding to a bias checker, wherein the bias checker detects bias within both the dataset and the model, based upon a bias checking algorithm and a bias checking policy, wherein the dataset comprises a plurality of attributes, wherein at least one of the plurality of attributes is identified as protected and wherein at least another of the plurality of attributes is identified as unprotected; computer readable program code configured to test the bias checking algorithm of the bias checker by (i) generating test cases that modify the dataset by introducing bias therein and (ii) running the bias checker against the modified dataset; computer readable program code configured to test the bias checking policy of the bias checker by generating a plurality of test cases and running the bias checker against the plurality of test cases, wherein the generating comprises: identifying a correlation between (i) an attribute identified as protected and (ii) an attributed identified as unprotected, wherein a correlation is identified between at least one unprotected attribute and at least one protected attributes having the highest correlation value of the dataset; and generating a test case having a generated dataset comprising (i) the protected attributes and (ii) the unprotected attributes having the highest correlation value to the protected attributes, wherein the generated dataset includes values including bias for each of the attributes of the generated dataset; and computer readable program code configured to provide a notification to a user regarding whether the bias checker failed to indicate bias for one or more of the plurality of attributes.

A further aspect of the invention provides a method, comprising: obtaining, from a user, (i) a dataset and model of a particular domain and (ii) a bias detector for the particular domain, wherein the dataset comprises a plurality of attributes, each having a plurality of values, wherein the bias detector is programmed with (i) a bias checking algorithm and (ii) a bias checking policy to detect bias within protected attributes within the dataset and the model; determining whether the bias detector is accurately detecting bias by testing the bias detector against the dataset and model, wherein the testing comprises: testing the bias checking algorithm by (i) modifying the dataset and model by changing the values of protected attributes of the dataset to values that are biased, (ii) testing the bias detector against the modified dataset and model, and (iii) identifying whether the bias detector detected bias; and testing the bias checking policy by (i) generating a plurality of test cases comprising (a) protected attributes and unprotected attributes identified as being correlated with the protected attributes and (b) values for the protected attributes and identified unprotected attributes having bias, (ii) testing the bias detector using the plurality of test cases, and (iii) identifying whether the bias detector detected bias; and providing, to the user, regarding whether the bias detector is accurately detecting bias.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
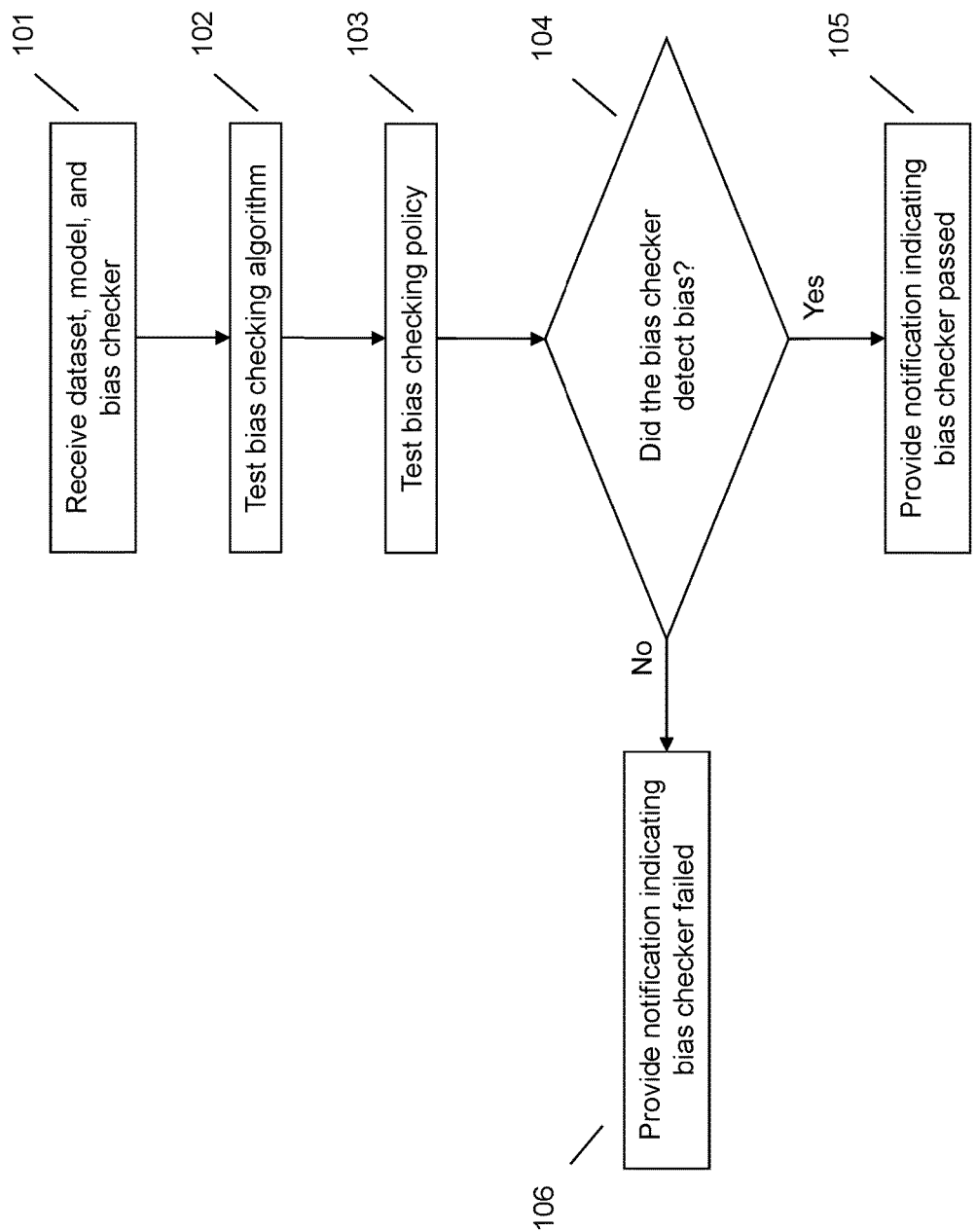
FIG. 1 illustrates a method of testing a bias checker to determine if the bias checker accurately detects bias within a dataset and model.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

To check for bias within a model and/or dataset the bias checker is programmed with a bias checking algorithm and a bias checking policy. The bias checking algorithm identifies the type of bias (e.g., disparate impact, individual discrimination, etc.) that should not be included in the model and/or dataset. The bias checking algorithm has a definition that identifies what the expected value or range for the decisions would be with no bias. For example, the definition may be that the ratio of affirmative decisions made for the majority class over the ratio of affirmative decisions made for the minority class should be within a predetermined range. If this ratio falls within the predetermined range then the model and/or dataset does not include bias. The bias checking policy identifies what attributes within the dataset and/or model are protected attributes that should not be used to bias the decision. The bias checking policy is related to the domain of the dataset and/or model. For example, a mortgage application domain may have different protected attributes than a college application domain.

However, the bias checkers are programmed or developed by users. Therefore, it is difficult to guarantee that the bias checkers are working properly. In other words, it is difficult to certify that the bias checker will actually detect bias within a model and/or dataset. There is currently no conventional technique for verifying that the bias checker actually accurately detects bias within a dataset and/or model. Rather, the entities using the bias checkers have to rely on the expertise of the bias checker programmer and hope that the bias checker is programmed correctly.

Accordingly, an embodiment provides a system and method for testing a bias checker to determine if the bias checker accurately detects bias within a dataset and model. In other words, rather than determining whether the model and/or dataset includes bias, which is the purpose of the bias checker, the proposed system and method determine whether the bias checker can accurately identify bias included within the model and/or dataset. The system may receive a dataset and model corresponding to a bias checker that is to be tested. The dataset may include a plurality of attributes and values for these attributes. For example, the dataset may include "income", "geographical region", and "time of year" as attributes. One or more of these attributes may also be identified as a protected attribute, or attribute that cannot influence the decision-making process. For example, the "time of year" attribute may be identified as a protected attribute. The remaining attributes may therefore be identified or inferred to be unprotected attributes, or attributes that can be used to influence the decision-making process.

The bias checker is programmed to detect bias within the dataset and/or model using a bias checking algorithm and a bias checking policy. The system may be used to test both the bias checking algorithm and the bias checking policy of the bias checker. The system may test the bias checking algorithm of the bias checker by modifying the dataset to introduce bias into the dataset and running the bias checker against the modified dataset. To test the bias checking policy, the system may generate a plurality of test cases and run the bias checker against the plurality of test cases. To generate the test cases, the system may identify a correlation between a protected attribute and an unprotected attribute. The system may identify attributes as correlated when the correlation value between the attributes is the highest of the dataset or when the correlation value is above a predetermined threshold. The system can then generate a dataset that includes the protected attributes and any correlated attributes and values for these attributes, where the values include bias. If the bias checker detects bias in both the tests of the bias checking algorithm and the bias checking policy, then the system may provide a notification that the bias checker has passed the bias checker test. In other words, a user may be notified that the bias checker can accurately detect bias. If the bias checker does not detect bias in one, or both, of the test of the bias checking algorithm and the test of the bias checking policy, the user may be provided a notification that the bias checker has failed the bias checker test. In other words, a user may be notified that the bias checker does not accurately detect bias.

Such a system provides a technical improvement over current bias detection systems by providing a system that can test the bias checker to determine if the bias checker can accurately detect bias within a model and/or dataset. Specifically, the system and method can determine if the bias checker can accurately detect bias with respect to protected attributes, or attributes identified as attributes that should not influence the decision-making process. Currently there is no conventional system for testing the bias checkers. Rather, the conventional systems require the entities employing the bias checker to trust that the bias checker was programmed correctly and, therefore, can accurately detect bias within the model and/or dataset. Thus, the described systems and methods provide a technique that allows for testing the bias checker to ensure that the bias checker is actually accurately detecting bias by testing the bias checker against a model and/or dataset that has known bias and determining whether the bias checker detects the introduced known bias.

FIG. 1 illustrates a method for testing a bias checker to determine if the bias checker accurately detects bias within a dataset and model. At 101 the system may receive a dataset and a model corresponding to a bias checker. The model may be any type of model, for example, a machine-learning model, a deep-learning model, a decision-tree model, or any other type of model that can be used in a decision-making process. The dataset may include training data that are used to train the model. The dataset may include attributes and values for the attributes. Attributes may be characteristics that are used in a decision-making process and that are requested from an applicant or person for which a decision is to be made. This person will be referred to herein as an "applicant" for ease of reading. However, it should be understood that the person can be any person whose attributes and values are being applied to the model for a resulting decision. For example, attributes may include "geographical location", "time", "applicant name", "time of year", "decision time", and any other attributes that may be necessary or requested during the decision-making process. Values may include the specific numeric, alphanumeric, or character values corresponding to the attributes that are unique to and that may be provided by an applicant, for example, "John Smith" may be the value for the attribute "applicant name".

The attributes may be split into two different categories, protected attributes and unprotected attributes. Protected attributes are those attributes that are identified as not able to be used for the decision-making process. In other words, protected attributes cannot be used to influence a decision regarding the applicant. Unprotected attributes, on the other hand, are those attributes that are identified as being able to be used to for the decision-making process. In other words, unprotected attributes can be used to influence a decision regarding the applicant. Whether attributes should be identified as protected or unprotected may be based upon a secondary source, for example, a law or regulation related to the domain, a database related to the domain, an information source related to the domain, or the like. Therefore, attributes identified as protected or unprotected may vary depending on the domain of the decision-making process. For example, a college application domain may have different attributes that are identified as protected than a mortgage application domain. Thus, determining which attributes should be treated as protected versus unprotected may be based upon the domain of the decision-making process.

Accordingly, the system may also receive a domain ontology that is related to the domain of the model and/or dataset. The domain ontology may be based upon the secondary source or may be captured from the secondary source. The domain ontology may provide an indication of which attributes should be treated as protected and, therefore, which attributes should be treated as unprotected. The domain ontology may also identify different assumptions of the bias checker, for example, what should be considered the majority class for an attribute, what should be considered a minority class for an attribute, what are the values for each class, and the like. Additionally or alternatively, an indication of which attributes are protected may be provided by a user. For example, a user may highlight, select, or otherwise indicate the attributes that should be treated as protected. It should be understood that the system may receive only an indication of the protected attributes and may, therefore, infer or assume that the remaining attributes should be treated as unprotected. Alternatively, the system may receive an indication of which attributes should be treated as protected and also an indication of which attributes should be treated as unprotected.

The bias checker or detector is programmed to detect bias within the dataset and/or model. Therefore, the bias checker or detector includes or is programmed with a bias checking algorithm and a bias checking policy. The bias checking algorithm identifies what type of bias the bias checker is attempting to detect (e.g., disparate impact, individual discrimination, etc.). The bias checking policy identifies which attributes are identified as protected, and, therefore, which attributes and values for those attributes should not influence the decision-making process. The bias checking policy also identifies which class within an attribute should be treated as the majority class and which class should be identified as the minority class. For example, for the attribute "time of year", the months January through June may be identified as the majority class while the months July through December may be identified as the minority class. The bias checking algorithm will identify the bias definition that is associated with the bias checking policy. The bias definition identifies what the expected value or range for the decisions would be with no bias. For example, the definition may be that the ratio of affirmative decisions made for the majority class over the ratio of affirmative decisions made for the minority class should be within a predetermined range. If this ratio falls within the predetermined range then the model and/or dataset does not include bias.

To determine whether the bias checker can detect bias, the system performs two tests, one of the bias checking algorithm and one of the bias checking policy. At 102 the system tests the bias checking algorithm of the bias checker. To test the bias checking algorithm, the system modifies the dataset to introduce bias into the dataset. Introducing bias may include creating one or more of a plurality of test cases using the dataset. A test case may include attributes and corresponding values generated as if an applicant has provided the attributes and values. However, these test cases purposely include values for protected attributes that, if the protected attribute is being used in the decision-making process, would result in a biased decision. In other words, if an attribute that is not supposed to be used in the decision-making process (i.e., a protected attribute) is used in the decision-making process, the test cases would result in biased decisions.

Once the test cases are generated the system compares the decision results against the bias checking algorithm of the bias checker. To check the bias checking algorithm the system finds several majority and minority class pairs within the modified dataset and uses these class pairs to check the bias checking algorithm. If the result of the test of the bias checking algorithm indicates that the decision results are within the value or range of the bias checking algorithm, thereby indicating no bias within the modified dataset, then the system identifies that the bias checker has failed to detect bias, thereby failing the bias checker test with respect to the bias checking algorithm. If, on the other hand, the result of the test of the bias checking algorithm indicates that the decision results are not within the value or range of the bias checking algorithm, thereby indicating that the modified dataset includes bias within the modified dataset, then the system identifies that the bias checker has successfully detected bias, thereby passing the bias checker test with respect to the bias checking algorithm.

At 103 the system tests the bias checking policy of the bias checker. Checking the bias checking policy ensures that the bias checker is detecting bias across the attributes that are identified as, or should be identified as, protected. In other words, even though some attributes are identified as protected, other attributes that are identified as unprotected may actually have a correlation to the protected attributes. If there is a correlation between protected and unprotected attributes then the decision-making process may be biased by using the unprotected attributes that are correlated with the protected attributes. In other words, if there is a correlation between a protected attribute "time of year" and an unprotected attribute "geographic region" a decision-making model can produced biased decisions by weighting the "geographic region" more heavily than other attributes. While this attribute is not actually a protected attribute, due to the correlation to a protected attribute, these decisions end up being biased based upon the protected attributes.

To test the bias checking policy, the system generates a plurality of test cases and runs the bias checker against the plurality of test cases. To generate the plurality of test cases for testing the bias checking policy, the system uses the same policy related to the domain as the dataset and model and generates test cases that include bias. These test cases are generated from a combination of attributes of the dataset and/or model. The tests cases include those attributes that are identified as protected by the bias checking policy. In addition, the test cases include attributes that are identified as unprotected but which have a correlation to protected attributes. To identify unprotected attributes that have a correlation with protected attributes, all the protected attributes are compared with all the unprotected attributes of the dataset. In the case that the values are numeric values, the system tests the values for the protected attributes for correlation against the values of the unprotected attributes.

In the case that the values are alphanumeric or character values, the system tests the values for the protected attributes for correlation, also referred to as co-occurrence in the case of the alphanumeric or character values, against the values of the unprotected attributes. Even in the case that the values are numeric values, co-occurrence may also be detected based upon metadata and/or other words or phrases included with attributes or values, for example, headers of the attributes, descriptions of the attributes, or the like. The system may use natural language processing techniques to extract keywords from the metadata and/or alphanumeric or character values. From these keywords the system can identify or extract concepts to associate with each attribute. The system may then conduct a search on world knowledge resources, for example, the Internet, known knowledge bases, user-generated social content, and the like, to identify concept overlaps and generate a concept overlap value. In other words, the system may access secondary sources to identify a correlation between concepts associated with one attribute and concepts associated with another attribute. The concept overlap value is similar to, or the same as, the correlation value. Thus, those unprotected attributes that have a high concept overlap value with a protected attribute are treated like those unprotected attributes that have a high correlation value with a protected attribute.

Unprotected attributes that have the highest correlation, or co-occurrence, with protected attributes are chosen to be included in the plurality of test cases. In other words, the unprotected attributes that have the highest correlation values to protected attributes are tested first along with the protected attributes so that bias can be detected faster. Other unprotected attributes can then be tested later if bias is not detected using the initial set of test cases. For subsequent testing the system may chose unprotected attributes based upon the correlation value, for example, by testing unprotected attributes in a descending correlation value method. In other words, the testing may first include unprotected attributes having the highest correlation value; a subsequent test may then include unprotected attributes having a second highest correlation value; and so on.

The system does not use attributes in the test cases that are identified as unprotected and that do not have a correlation with protected attributes. Stated differently, the only unprotected attributes that are included in the test cases are those unprotected attributes that have a correlation with protected attributes. In other words, the only attributes used in generation of the test cases are the protected attributes and unprotected attributes that have a correlation to the protected attributes. Since only the attributes that are identified as protected and attributes that have a correlation to the protected attributes are used for generating the test cases, the computation is non-exponential in nature causing the bias checker to fail early, thereby making the testing efficient. In other words, the bias checking testing is minimalistic by removing subsets of attributes from the dataset and model that would have no indication regarding whether the bias checker accurately detects bias within a dataset and/or model.

The system then generates test cases having the protected attributes and those unprotected attributes that have the highest correlation value to the protected attributes. These test cases include values for these attributes that include bias, thereby allowing for testing of the bias checking policy. The bias checker can then be tested using these generated test cases. If the result of the test of the bias checking policy indicates that the bias checker has not detected bias using the bias checking policy, then the system identifies that the bias checker has failed to detect bias, thereby failing the bias checker test with respect to the bias checking policy. If, on the other hand, the result of the test of the bias checking policy indicates that the bias checker has detected bias using the bias checking policy, then the system identifies that the bias checker has detected bias, thereby passing the bias checker test with respect to the bias checking policy.

Additionally, during the testing of the bias checker, the system can determine whether any unprotected attributes included in the test cases can or should be labeled as protected, for example, based upon the correlation of the unprotected attribute with a protected attribute. If the unprotected attribute should be labeled as protected, the system will add the attribute to the set of protected attributes. Additionally, the system generates a confidence score that indicates how confident the system is with respect to whether the unprotected attribute should be identified as a protected attribute. The confidence score may be derived from given thresholds and provided ground truths. If the system determines that the unprotected attribute should not be labeled as protected, then the system may remove the unprotected attribute from any subsequent test cases.

In order to keep the testing efficient the system may employ a decrement-based exploration, thereby minimizing the number of attributes that need to be included in test cases. Once the attributes to be included in the test cases are identified, the system carries out an examination on the test cases and the results of the test cases. If the bias checker fails for a test case, the system checks whether another test case would be subsumed by the test case that the bias checker failed. In other words, if one test case includes all the attributes of another test case or one test case has results that would subsume the results of another test case, then the system does not need to test the subsumed test case because it can be inferred that the bias checker would fail for the subsumed test case. Accordingly, only results from the first test case would be returned.

At 104 the system may determine whether the bias checker detected bias based upon the results from the bias checking algorithm test and the bias checking policy test. If the bias checker fails to detect bias for either or both the bias checking algorithm test and the bias checking policy test, the system determines that the bias checker has failed at 104. In the case that the bias checker fails, the system may provide a notification indicating that the bias checker failed at 106. If, on the other hand, the bias checker detects bias during both the bias checking algorithm test and the bias checking policy test, the system determines that the bias checker has passed at 104. In the case the bias checker passes, the system may provide a notification indicating that the bias checker passed at 105, for example, as a certification of the bias checker.

In either the case of a pass or fail, the notification may include a confidence level value corresponding to bias detection accuracy. In other words, the system may provide a confidence level value indicating how well or likely the bias checker is to detect bias within a dataset and/or model. In the case of a failure, the notification may also indicate a definition of the bias that was undetected. The notification may also include an indication of unprotected attributes that should be labeled as protected and the confidence score, if included, associated with that unprotected attribute that indicates how confident the system is that the unprotected attribute should be labeled as protected.

Using the same tests, the system can test bias detection algorithms and/or bias checking policies without a bias checker. In other words, the system provides a framework that allows a developer of a bias checker to provide the bias detection algorithm and/or bias checking policy to the framework for testing. The framework can then test the provided bias detection algorithm and/or bias checking policy using the described system and then certify whether the bias detection algorithm and/or bias checking policy pass or fail the testing. The system can also provide a confidence level regarding how well the bias checking algorithm and/or bias checking policy would detect bias within a dataset and/or model. The system may also provide a summary or description that identifies the important reasons or features that resulted in the confidence level. For example, if a specific part of the algorithm resulted in the confidence level, the system may provide a summary identifying that particular part of the algorithm as being the important feature resulting in the confidence level.

Figure 2:
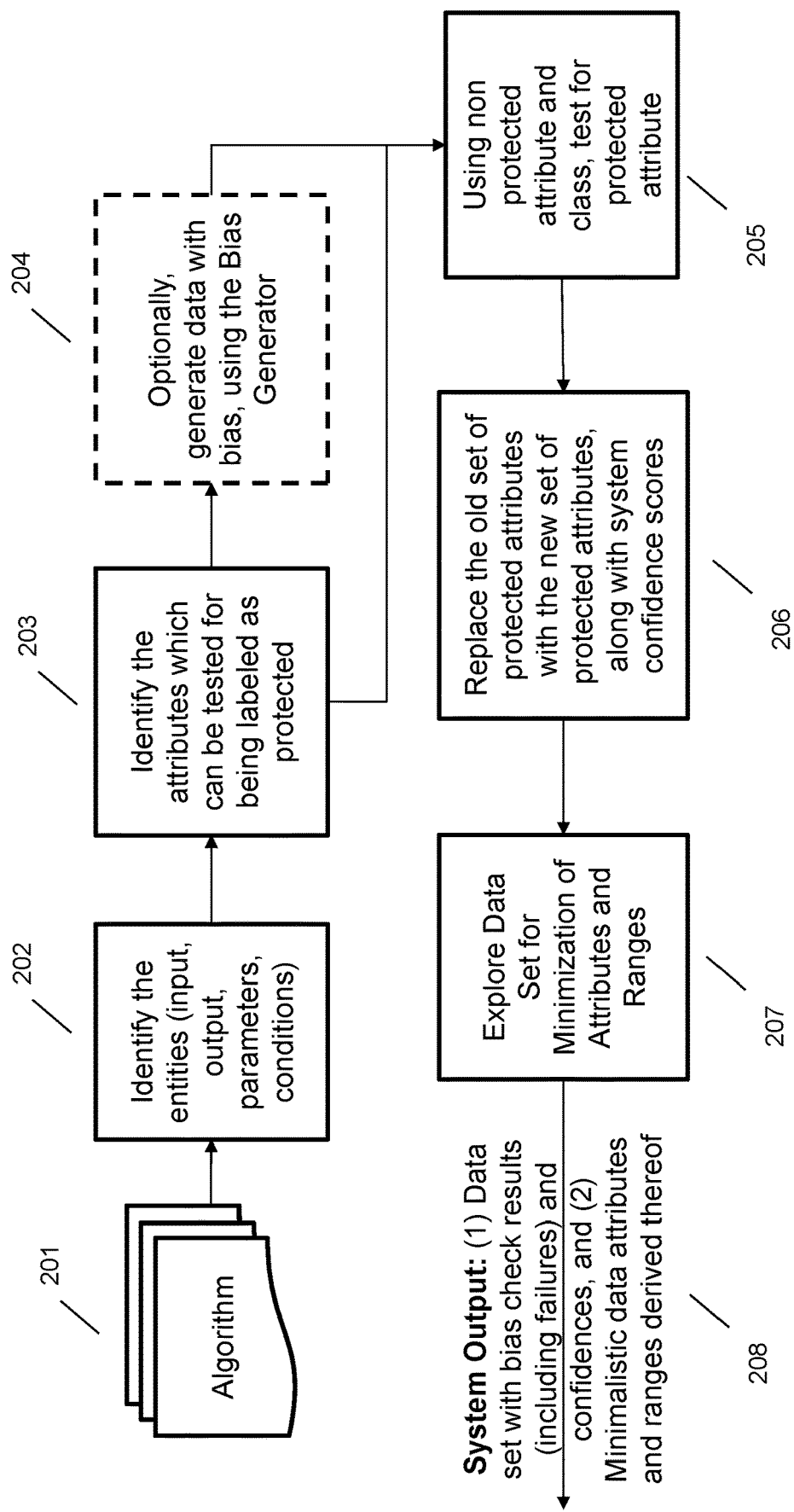
FIG. 2 illustrates an example overall workflow for testing a bias checker to determine if the bias checker accurately detects bias within a dataset and model.

As an overall summary, referring to FIG. 2, the system may run a bias checker testing algorithm at 201. At 202, the system may identify the entities (e.g., the inputs, outputs, parameters, conditions, etc.) within the dataset and/or model, the domain, the bias checking algorithm of the bias checker, and the bias checking policy of the bias checker.

From the dataset and/or model and the bias checking policy, the system identifies the attributes that can be tested for bias by identifying those attributes labeled as protected at 203. In the case that the system is testing the bias checking algorithm, the system may generate a dataset having bias using a bias generator at 204. This dataset can then be used to test the bias checking algorithm as discussed herein.

At 205 the system identifies non-protected attributes having a correlation to the protected attributes. Additionally, the system identifies the majority/minority classes within both the protected attributes and non-protected attributes that have a correlation with the protected attributes, also referred to as correlated non-protected or unprotected attributes. The system then tests the bias checking policy for the protected attributes and identified correlated non-protected attributes utilizing the identified classes. If the identified correlated non-protected attributes are identified as having an effect on whether the bias checker can detect bias, the identified correlated non-protected attributes are added to the protected attribute list and the old set of protected attributes is replaced with the modified list of protected attributes, along with confidence scores identifying how confident the system is that the identified non-protected attributes should be treated as protected attributes at 206. At 207 the system can explore the dataset for minimization of attributes and ranges to provide a result set that includes a minimal set of attributes, test cases, and/or data value ranges. The system then outputs, at 208, the dataset with the bias check results, including identification of failures and confidence scores related to how likely the bias checker is to detect bias within a particular domain, and the minimalistic data attributes and ranges.

Thus, the described systems and methods represent a technical improvement over current bias checkers by providing a system that can test the bias checker to determine whether the bias checker can accurately detect bias within a dataset and/or model. A conventional system does not exist that can test the bias checker to determine whether or not the bias checker can detect bias. Rather, conventional techniques rely on the bias checker programming to accurately program the bias checker so that bias can accurately be detected. Thus, the described system and method allows for a technique for checking bias checkers so that entities that employ the bias checkers can be assured that the bias checker will accurately detect bias within a dataset and/or model, which is not possible with conventional systems.

Figure 3:
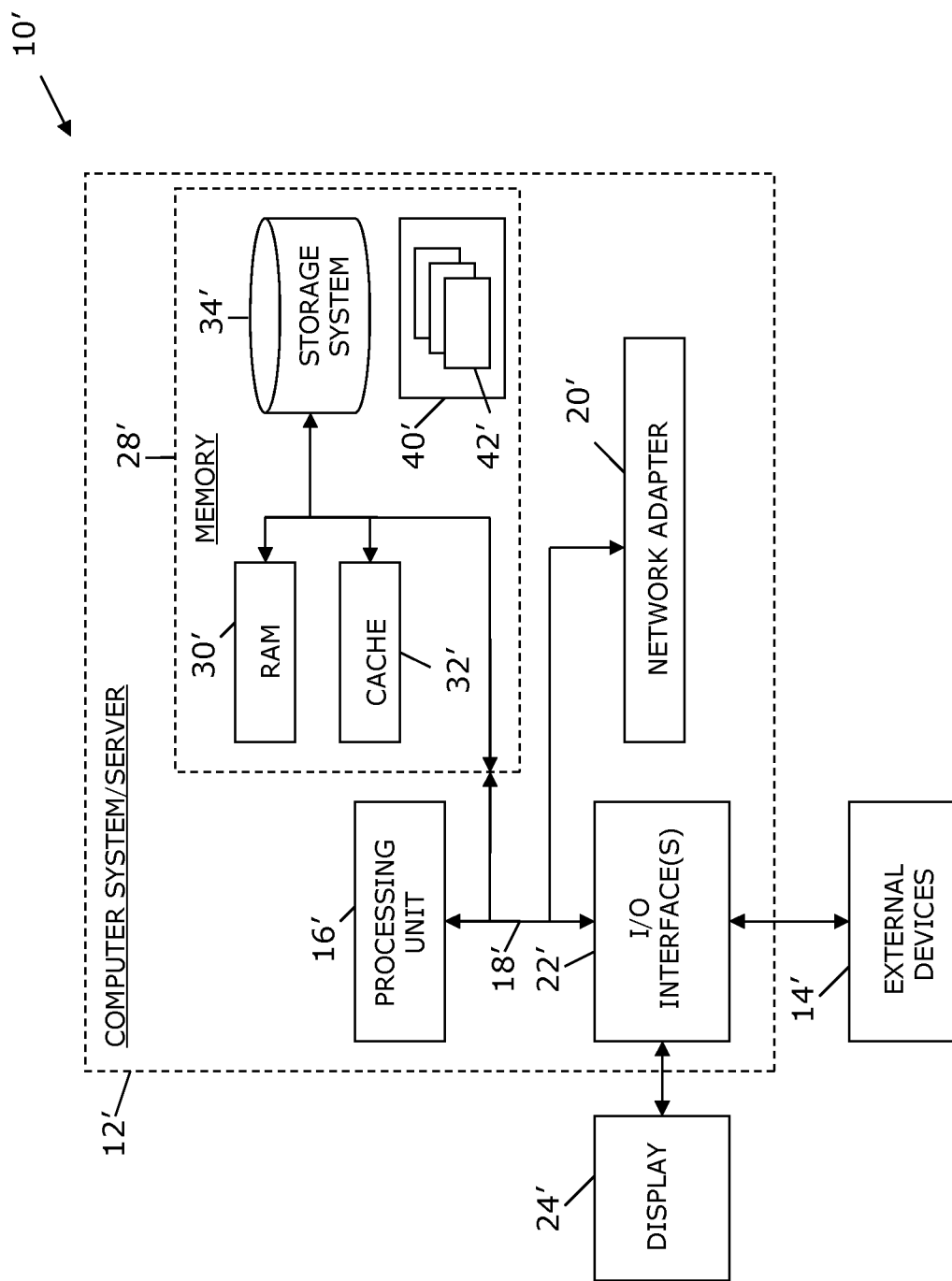
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving a dataset and a model corresponding to a bias checker, wherein the bias checker detects bias within both the dataset and the model, based upon a bias checking algorithm and a bias checking policy, wherein the dataset comprises a plurality of attributes, wherein at least one of the plurality of attributes is identified as protected and wherein at least another of the plurality of attributes is identified as unprotected;
testing the bias checking algorithm of the bias checker by (i) generating test cases that modify the dataset by introducing bias therein and (ii) running the bias checker against the modified dataset;
testing the bias checking policy of the bias checker by generating a plurality of test cases and running the bias checker against the plurality of test cases, wherein the generating comprises:
identifying a correlation between (i) an attribute identified as protected and (ii) an attributed identified as unprotected, wherein a correlation is identified between at least one unprotected attribute and at least one protected attributes having the highest correlation value of the dataset; and
generating a test case having a generated dataset comprising (i) the protected attributes and (ii) the unprotected attributes having the highest correlation value to the protected attributes, wherein the generated dataset includes values including bias for each of the attributes of the generated dataset; and
providing a notification to a user regarding whether the bias checker failed to indicate bias for one or more of the plurality of attributes.

2. The method of claim 1, wherein the identifying a correlation comprises identifying a correlation between (i) values of the attribute identified as protected and (ii) values of the attribute identified as unprotected.

3. The method of claim 1, wherein the identifying a correlation comprises identifying a co-occurrence between (i) keywords extracted from metadata of attributes identified as protected and (ii) keywords extracted from metadata of attributes identified as unprotected.

4. The method of claim 3, wherein the identifying a co-occurrence comprises identifying, using a knowledge base, an overlap in concepts of (i) the keywords extracted from metadata of attributes identified as protected and (ii) the keywords extracted from metadata of attributes identified as unprotected.

5. The method of claim 1, wherein the providing a notification comprises providing a confidence level value corresponding to bias detection accuracy.

6. The method of claim 1, wherein the providing a notification comprises indicating a definition of the bias that was undetected.

7. The method of claim 1, wherein the testing the bias checking policy comprises adding an attribute identified as unprotected to a list of attributes identified as protected based upon the testing of the bias checking policy.

8. The method of claim 7, wherein the providing a notification comprises (i) indicating that the attribute identified as unprotected should be identified as protected and (ii) providing a confidence score that the attributed identified as unprotected should be identified as protected.

9. The method of claim 1, wherein the plurality of test cases do not include attributes that are identified as unprotected unless the attribute has a correlation with a protected attribute.

10. The method of claim 1, wherein the receiving comprises receiving a domain ontology for the dataset and the model, wherein the domain ontology identifies the attributes identified as protected and the attributes identified as unprotected.

11. An apparatus, comprising:
at least one processor; and
a non-transitory computer readable storage medium having computer readable program code embodied therewith and executable by the at least one processor, the computer readable program code comprising:
computer readable program code configured to receive a dataset and a model corresponding to a bias checker, wherein the bias checker detects bias within both the dataset and the model, based upon a bias checking algorithm and a bias checking policy, wherein the dataset comprises a plurality of attributes, wherein at least one of the plurality of attributes is identified as protected and wherein at least another of the plurality of attributes is identified as unprotected;
computer readable program code configured to test the bias checking algorithm of the bias checker by (i) generating test cases that modify the dataset by introducing bias therein and (ii) running the bias checker against the modified dataset;
computer readable program code configured to test the bias checking policy of the bias checker by generating a plurality of test cases and running the bias checker against the plurality of test cases, wherein the generating comprises:
identifying a correlation between (i) an attribute identified as protected and (ii) an attributed identified as unprotected, wherein a correlation is identified between at least one unprotected attribute and at least one protected attributes having the highest correlation value of the dataset; and
generating a test case having a generated dataset comprising (i) the protected attributes and (ii) the unprotected attributes having the highest correlation value to the protected attributes, wherein the generated dataset includes values including bias for each of the attributes of the generated dataset; and
computer readable program code configured to provide a notification to a user regarding whether the bias checker failed to indicate bias for one or more of the plurality of attributes.

12. A computer program product, comprising:
a non-transitory computer readable storage medium having computer readable program code embodied therewith, the computer readable program code executable by a processor and comprising:
computer readable program code configured to receive a dataset and a model corresponding to a bias checker, wherein the bias checker detects bias within both the dataset and the model, based upon a bias checking algorithm and a bias checking policy, wherein the dataset comprises a plurality of attributes, wherein at least one of the plurality of attributes is identified as protected and wherein at least another of the plurality of attributes is identified as unprotected;
computer readable program code configured to test the bias checking algorithm of the bias checker by (i) generating test cases that modify the dataset by introducing bias therein and (ii) running the bias checker against the modified dataset;
computer readable program code configured to test the bias checking policy of the bias checker by generating a plurality of test cases and running the bias checker against the plurality of test cases, wherein the generating comprises:
identifying a correlation between (i) an attribute identified as protected and (ii) an attributed identified as unprotected, wherein a correlation is identified between at least one unprotected attribute and at least one protected attributes having the highest correlation value of the dataset; and generating a test case having a generated dataset comprising (i) the protected attributes and (ii) the unprotected attributes having the highest correlation value to the protected attributes, wherein the generated dataset includes values including bias for each of the attributes of the generated dataset; and computer readable program code configured to provide a notification to a user regarding whether the bias checker failed to indicate bias for one or more of the plurality of attributes.

13. The computer program product of claim 12, wherein the identifying a correlation comprises identifying a correlation between (i) values of the attribute identified as protected and (ii) values of the attribute identified as unprotected.

14. The computer program product of claim 12, wherein the identifying a correlation comprises identifying a co-occurrence between (i) keywords extracted from metadata of attributes identified as protected and (ii) keywords extracted from metadata of attributes identified as unprotected.

15. The computer program product of claim 14, wherein the identifying a co-occurrence comprises identifying, using a knowledge base, an overlap in concepts of (i) the keywords extracted from metadata of attributes identified as protected and (ii) the keywords extracted from metadata of attributes identified as unprotected.

16. The computer program product of claim 12, wherein the providing a notification comprises providing a confidence level value corresponding to bias detection accuracy.

17. The computer program product of claim 12, wherein the providing a notification comprises indicating a definition of the bias that was undetected.

18. The computer program product of claim 12, wherein the testing the bias checking policy comprises adding an attribute identified as unprotected to a list of attributes identified as protected based upon the testing of the bias checking policy.

19. The computer program product of claim 12, wherein the plurality of test cases do not include attributes that are identified as unprotected unless the attribute has a correlation with a protected attribute.

20. A method, comprising:

utilizing at least one processor to execute computer code that performs the steps of:

obtaining, from a user, (i) a dataset and model of a particular domain and (ii) a bias detector for the particular domain, wherein the dataset comprises a plurality of attributes, each having a plurality of values, wherein the bias detector is programmed with (i) a bias checking algorithm and (ii) a bias checking policy to detect bias within protected attributes within the dataset and the model;

determining whether the bias detector is accurately detecting bias by testing the bias detector against the dataset and model, wherein the testing comprises:

testing the bias checking algorithm by (i) modifying the dataset and model by changing the values of protected attributes of the dataset to values that are biased, (ii) testing the bias detector against the modified dataset and model, and (iii) identifying whether the bias detector detected bias; and testing the bias checking policy by (i) generating a plurality of test cases comprising (a) protected attributes and unprotected attributes identified as being correlated with the protected attributes and (b) values for the protected attributes and identified unprotected attributes having bias, (ii) testing the bias detector using the plurality of test cases, and (iii) identifying whether the bias detector detected bias; and providing, to the user, regarding whether the bias detector is accurately detecting bias.

* * * * *